United States Patent
Yamada

(10) Patent No.: US 7,689,855 B2
(45) Date of Patent: Mar. 30, 2010

(54) CLOCK SUPPLYING APPARATUS AND CONTROL METHOD THEREOF

(75) Inventor: Naoto Yamada, Kawasaki (JP)

(73) Assignee: Canon Kabushiki Kaisha (JP)

( * ) Notice: Subject to any disclaimer, the term of this patent is extended or adjusted under 35 U.S.C. 154(b) by 664 days.

(21) Appl. No.: 11/559,115

(22) Filed: Nov. 13, 2006

(65) Prior Publication Data

US 2007/0121771 A1    May 31, 2007

(30) Foreign Application Priority Data

Nov. 25, 2005    (JP)    ............. 2005-340952

(51) Int. Cl.
- *G06F 1/00* (2006.01)
- *H04L 7/00* (2006.01)
- *H03L 7/099* (2006.01)

(52) U.S. Cl. ............ 713/500; 713/300; 375/354; 331/177 R

(58) Field of Classification Search ........... 713/500, 713/300; 375/354; 331/177 R See application file for complete search history.

(56) References Cited

U.S. PATENT DOCUMENTS

| | | | |
|---|---|---|---|
| 5,724,591 A | | 3/1998 | Hara et al. |
| 5,822,596 A | * | 10/1998 | Casal et al. ............. 713/322 |
| 6,260,151 B1 | | 7/2001 | Omizo et al. |
| 6,963,326 B2 | * | 11/2005 | Hsu et al. ............... 345/99 |
| 7,430,264 B2 | * | 9/2008 | Boerstler et al. ......... 375/375 |
| 2005/0144492 A1 | * | 6/2005 | Yun et al. ............... 713/300 |

FOREIGN PATENT DOCUMENTS

| | | |
|---|---|---|
| JP | 10-254587 A | 9/1998 |
| JP | 10-308450 | 11/1998 |

\* cited by examiner

*Primary Examiner*—Thuan N Du
*Assistant Examiner*—Stefan Stoynov
(74) *Attorney, Agent, or Firm*—Rossi, Kimms & McDowell LLP

(57) ABSTRACT

A clock supplying apparatus capable of suppressing a current fluctuation as much as possible when supply of a clock signal to a circuit block is started or stopped. At start or termination of the clock signal supply to the circuit block, the clock signal frequency is temporarily changed to a low frequency lower than a standard frequency.

14 Claims, 13 Drawing Sheets

CLOCK SUPPLYING APPARATUS AND CONTROL METHOD THEREOF

BACKGROUND OF THE INVENTION

1. Field of the Invention

The present invention relates to a clock supplying apparatus and a control method thereof, and more particularly, to a clock supplying apparatus and a control method that are suitable to supply a clock signal to a semiconductor integrated circuit or other circuit blocks.

2. Description of the Related Art

In recent years, semiconductor integrated circuits such as ASICs (Application Specified ICs) have become large in scale, and with their increasing scale, they are generally designed as clock synchronous circuits. Besides, there is an increasing demand for low power LSI chips that are low in power consumption. To meet the demand, gated clock circuits capable of stopping, as required, clock signal supply to circuit blocks are realized to reduce the power consumption (refer to Japanese Laid-open Patent Publication (Kokai) No. H10-308450).

More specifically, the conventional ASIC includes flip-flops for individually controlling the drive of circuit blocks in the ASIC, and a free-run clock signal is always supplied to all the flip-flops. As a result, even if one or more circuit blocks are not driven due to for example that they are in a waiting mode, all the flip-flops for the circuit blocks are always ON/OFF operated (toggle operated), resulting in wasted power consumption.

In addition, recent ASICs are designed to be driven at high speed to conform to the increase in circuit scale and clock signal frequency, and thus their power consumption is large. Therefore, a reduction in power consumption has been demanded.

It has also been known to use the ASIC for image processing in information processing apparatuses, which include digital copying machines, multifunction peripherals with scanner, printer and FAX functions, and cellular phones. These machines and apparatuses are generally held for a long period of time in a waiting mode that is comprised of various waiting states. In a multifunction peripheral for example, there are various waiting modes such as a waiting state where the FAX function is ON and the printer and scanner functions are OFF, and another waiting state where the FAX and printer functions are ON and the scanner function is OFF.

The gated clock circuit is very useful to reduce power consumption in these waiting states. Specifically, the gated clock circuit can stop the clock signal supply to flip-flops in a circuit block that is functionally OFF, thereby stopping the toggle operation of the flip-flops for reduction of power consumption. Thus, especially in the information processing apparatuses which can have a long waiting time period, a considerable reduction in power consumption can be realized by using the ASIC installed with the gated clock circuit.

However, in an ASIC with plural function blocks, when a certain function block is stopped operating by means of the gated clock system, the toggle operation (ON/OFF operation) of flip-flops of the stopped function block is abruptly stopped. As a result, the consumption current in the stopped function block abruptly decreases, but the power consumption of the entire ASIC does not decrease abruptly, resulting in increase in bias voltages supplied to the other function blocks. When any of the increasing bias voltages exceeds the rated voltage of the ASIC, there will be an erroneous operation or hung-up (locked state) of the ASIC.

When the operation of a certain function block is started by means of the gated clock system, flip-flops of the started function block abruptly starts the toggle operation (ON/OFF operation). This causes an abrupt increase in the consumption current in the started function block, but the power consumption in the entire ASIC does not increase, which results in decrease in bias voltages applied to the other function blocks. When any of the decreasing bias voltages is less than the rated ASIC voltage, there will be an erroneous operation or hung-up (locked state) of the ASIC.

To obviate this, a technique is used of inserting a capacitor between the power supply line and the ground line for the ASIC, to thereby suppress an abrupt change in power source line voltage.

With the speeding up of clock signal and increase in circuit scale in recent ASICs, however, a large current fluctuation can be caused even in the case where the gated clock technique is applied, making it difficult to suppress the current fluctuation by the capacitor insertion technique.

In addition, there is a demand for further improving the response of the power supply circuit for the ASIC to the current fluctuation, which results in increased costs.

SUMMARY OF THE INVENTION

An object of the present invention is to provide a clock supplying apparatus and a control method thereof that are capable of suppressing a current fluctuation as much as possible when clock signal supply to a circuit block is started or stopped.

In order to attain the object, according to a first aspect of the present invention, there is provided a clock supplying apparatus for supplying a clock signal to at least one circuit block, comprising a generation unit that generates the clock signal, a control unit that controls a frequency of the clock signal generated by the generation unit, and a switching unit that switches a supply state that determines whether or not the clock signal generated by the generation unit is to be supplied to the circuit block, wherein, when the switching unit switches the supply state, the control unit controls the frequency of the clock signal so as to be temporarily lowered.

According to the clock supplying apparatus of this invention, the frequency of the clock signal is changed when the supply of the clock signal to a circuit block is started or stopped, thus making it possible to suppress a current fluctuation as much as possible upon start or stoppage of the clock signal supply to the circuit block.

Preferably, when the switching unit switches the supply state, the control unit controls the frequency of the clock signal so as to be temporarily lowered to a frequency corresponding to an amount of power consumption of the circuit block for which the supply state is to be switched.

More preferably, the clock supplying apparatus includes a plurality of circuit blocks, and the control unit controls the frequency of the clock signal so as to be temporarily lowered to a frequency corresponding to an amount of power consumption of circuit blocks for which the switching unit simultaneously switches the supply state.

Alternatively, the clock supplying apparatus includes a plurality of circuit blocks, and the control unit controls the frequency of the clock signal so as to be temporarily lowered to a frequency corresponding to number of circuit blocks for which the switching unit simultaneously switches the supply state.

Preferably, when lowering the frequency of the clock signal, the control unit causes the frequency to gradually lower toward a target frequency.

More preferably, the control unit sets a new target frequency at intervals of predetermined period of time to thereby gradually lower the frequency of the clock signal toward a final target frequency.

Preferably, when changing the frequency of the clock signal from a standard frequency before change and then returning the frequency to the standard frequency, the control unit returns the frequency while compensating for a difference between clock cycles at the frequency after change and clock cycles at the standard frequency.

According to a second aspect of the present invention, there is provided a control method or a clock supplying apparatus that supplies a clock signal to at least one circuit block, comprising a control step of controlling a frequency of a clock signal generated by a generation unit, and a switching step of switching a supply state that determines whether or not the clock signal generated by the generation unit is to be supplied to the circuit block, wherein, when the switching step switches the supply state, the control step controls the frequency of the clock signal so as to be temporarily lowered.

Preferably, when the switching step switches the supply state, the control step controls the frequency of the clock signal so as to be temporarily lowered to a frequency corresponding to an amount of power consumption of the circuit block for which the supply state is to be changed.

More preferably, the clock supplying apparatus includes a plurality of circuit blocks, and the control step controls the frequency of the clock signal so as to be temporarily lowered to a frequency corresponding to an amount of power consumption of circuit blocks for which the switching step simultaneously switches the supply state.

Alternatively, the clock supplying apparatus includes a plurality of circuit blocks, and the control step controls the frequency of the clock signal so as to be temporarily lowered to a frequency corresponding to number of circuit blocks for which the switching step simultaneously switches the supply state.

Preferably, when lowering the frequency of the clock signal, the control step causes the frequency to gradually lower toward a target frequency.

More preferably, the control step sets a new target frequency at intervals of predetermined period of time to thereby gradually lower the frequency of the clock signal toward a final target frequency.

Further features of the present invention will become apparent from the following description of exemplary embodiments with reference to the attached drawings.

DESCRIPTION OF THE PREFERRED EMBODIMENTS

The present invention will now be described in detail below with reference to the drawings showing preferred embodiments thereof.

First Embodiment

Figure 1A:
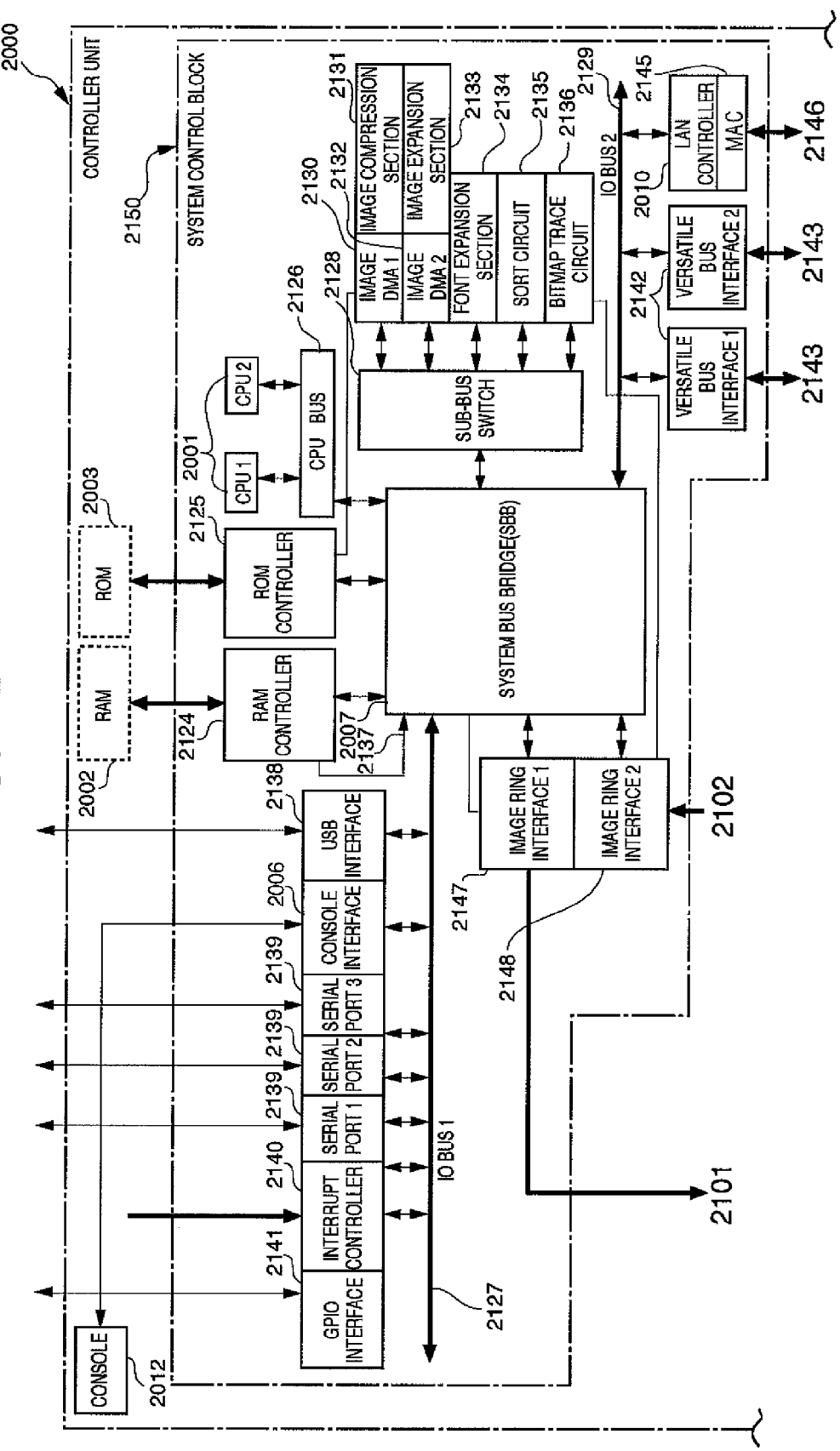
FIG. 1A is part of a schematic block diagram showing the construction of an image processing apparatus to which each of clock supplying apparatuses according to preferred embodiments of this invention is applied.
Figure 1B:
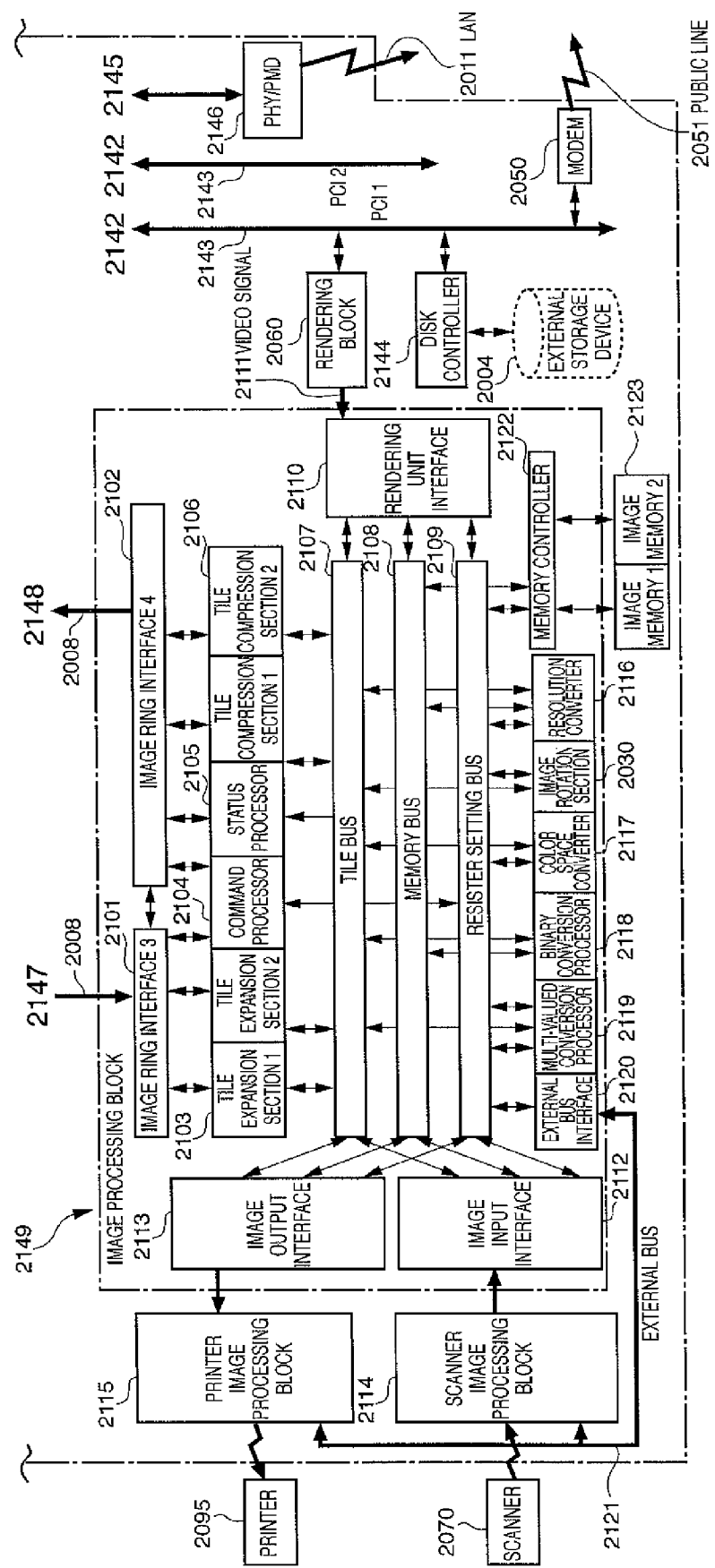
FIG. 1B is the remaining part of the schematic block diagram of the image processing apparatus.

FIGS. 1A and 1B are a schematic block diagram showing the construction of an image processing apparatus to which a clock supplying apparatus according to the present embodiment is applied. Referring to FIGS. 1A and 1B, a controller unit 2000 is connected to a scanner 2070 and a printer 2095, and also to networks, such as a LAN 2011 and a public line (WAN) 2051, for input/output of image information and device information and image development of PDL (Page Description Language) data.

The controller unit 2000 is mainly comprised of a system control block 2150, an image processing block 2149, a printer image processing block 2115, and a scanner image processing block 2114. These blocks 2150, 2149, 2115 and 2114 are supplied with power from a common power source and driven with gated clock system-based clock signals. As for clock signal supply control, a detailed explanation will be given later.

First, the construction of the system control block 2150 will be explained. The system control block 2150 includes a CPU 2001 for overall control of the image processing apparatus. In the CPU 2001 of this embodiment, two CPUs are used. These CPUs are connected to a common CPU bus 2126 and also to a system bus bridge 2007 which serves as a bus switch and to which the CPU bus 2126, a RAM controller 2124, a ROM controller 2125, a first IO bus 2127, a sub-bus switch 2128, a second IO bus 2129, and first and second image ring interfaces 2147, 2148 are connected.

The sub-bus switch 2128 serves as a second bus switch, to which first and second image DMAs 2130, 2132, a font expansion section 2134, a sort circuit 2135, and a bitmap trace circuit 2136 are connected. The sub-bus switch 2128 arbitrates memory access requests output from the image DMAs, and connects them to the system bus bridge 2007.

A RAM 2002 is controlled by the RAM controller 2124 and serves as a work memory for the CPU 2001. The RAM 2002 is also utilized as an image memory for temporarily storing image data. A ROM 2003 is controlled by the ROM controller 2125, and stores a boot program of the system and the like. In the ROM 2003, application programs for implementing processes shown in FIGS. 4, 5 and 9-11 described later are also stored.

The first image DMA 2130 controls an image compression section 2131 on the basis of information set via a register access ring 2137 to read out non-compressed data temporarily stored on the RAM 2002, to compress the readout data, and to write back (store) the compressed data. The image compression section 2131 carries out JPEG (Joint Photographic Experts Group) based compression.

The second image DMA 2132 controls an image expansion section 2133 on the basis of information set via the register access ring 2137 to read out the compressed data temporarily stored on the RAM 2002, to expand the readout data, and to write back the expanded data. The image expansion section 2133 carries out JPEG-based expansion.

The font expansion section 2134 expands compressed font data stored in the ROM 2003 or the RAM 2002 on the basis of font codes contained in PDL data which is externally transferred via a network such as a LAN interface 2011. For the font expansion in the font expansion section 2134, the FBE algorithm is used. The sort circuit 2135 sorts display list objects generated during the rendering process of PDL data. The bitmap trace circuit 2136 extracts edge information from bitmap data.

To the first IO bus 2127, a controller of a USB bus as a standard bus, a USB interface 2138, versatile serial ports 2139, an interrupt controller 2140, and a GPIO interface 2141 are connected. To the second IO bus 2129, first and second versatile bus interfaces 2142 and a LAN controller 2010 are connected.

A console interface (I/F) 2006 interfaces with a console (UI) 2012, and outputs image data to be displayed on the console 2012 to it. The console interface 2006 has a function of transferring information, which is input at the console 2012 by the user, to the CPU 2001.

A versatile bus interface 2142, which includes two identical bus interfaces, serves as a bus bridge and supports a standard IO bus that is comprised of a PCI bus 2143. An external storage device 2004 comprises a hard disk drive that stores system software, image data, and the like, and is connected to one of PCI buses (a first PCI bus) 2143 via a disk controller 2144. The LAN controller 2010 is connected to the LAN 2011 via a MAC circuit 2145 and a PHY/PMD circuit 2146 to input/output information through the LAN 2011. A modem 2050 is connected to the public line 2051 to input/output information therethrough.

The first and second image ring interfaces 2147, 2148 serve as DMA controllers. Specifically, each of the image ring interfaces 2147, 2148 is connected to the system bus bridge 2007 and to an image ring 2008. Data compressed after being tiled is DMA transferred through the image ring interfaces between the RAM 2002 and the image processing block 2149. It should be noted that the image ring 2008 comprises a combination of a pair of one-way connection routes (first and second image rings) and transfers image data at high speed.

Next, the construction of the image processing block 2149 will be explained. The image ring 2008 is connected to third and fourth image ring interfaces 2101, 2102 in the image processing block 2149. Each of the image ring interfaces 2101 and 2102 is connected to corresponding ones of two tile expansion sections 2103, a command processor 2104, a status processor 2105, and two tile compression sections 2106.

The tile expansion sections 2103 are also connected to a tile bus 2107, and expand compressed image data input from the image ring 2008, and transfer the expanded image data to the tile bus 2107. For the image data expansion in the tile expansion sections 2103, JPEG and PackBits are used.

The tile compression sections 2106 are connected to the third and fourth image ring interfaces 2101, 2102 and to the tile bus 2107. The tile compression sections 2106 compress non-compressed image data input from the tile bus 2107, and transfer the compressed image data to the image ring 2008. As in the tile explosion sections 2103, JPEG and PackBits are used for image data compression in the tile compression sections 2106.

The command processor 2104 is connected to the third and fourth image ring interfaces 2101, 2102 and to a register setting bus 2109, and writes a register setting request, which is issued by the CPU 2001, in a corresponding block connected to the register setting bus 2109. Also, the command processor 2104 reads out information from a corresponding register via the register setting bus 2109 on the basis of a register read request issued by the CPU 2001, and transfers the readout information to the fourth image ring interface 2102.

The status processor 2105 monitors information in the image processing block 2149, and generates, where necessary, an interrupt packet used to issue an interrupt to the CPU 2001. The generated interrupt packet is output to the fourth image ring interface 2102.

To the tile bus 2107, a rendering unit interface 2110, an image input interface 2112, an image output interface 2113, a multi-valued conversion processor 2119, a binary conversion processor 2118, a color space converter 2117, an image rotation section 2030, and a resolution converter 2116 are connected in addition to the aforesaid blocks.

A rendering block 2060 renders a PDL code or intermediate display list to a bitmap image, and outputs rendered bitmap image as a general video signal 2111. The rendering unit interface 2110 receives a bitmap image generated by the rendering block 2060.

The rendering unit interface 2110 has connections to the tile bus 2107, a memory bus 2108, and the register setting bus 2109. The rendering unit interface 2110 converts an input raster image into a tile image by a predetermined method set via the register setting bus 2109, synchronizes clocks, and outputs the tile image to the tile bus 2107.

The image input interface 2112 converts raster image data subjected to image correction by the scanner image processing block 2114 into a tile image by a predetermined method set via the register setting bus 2109, synchronizes clocks, and outputs the tile image to the tile bus 2107.

The image output interface 2113 converts tile image data input from the tile bus 2107 into a raster image, changes a clock rate, and outputs the raster image to the printer image processing block 2115.

The image rotation section 2030 rotates image data. The resolution converter 2116 converts the resolution of an image. The color space converter 2117 performs color space conversion of color and grayscale images. The binary conversion processor 2118 converts a multi-valued (color & grayscale) image into a binary image. The multi-valued conversion processor 2119 converts a binary image into multi-valued data.

An external bus interface 2120 outputs, onto an external bus 2121, a write/read request issued by the CPU 2001 via the first to fourth image ring interfaces 2147, 2148, 2101 and 2102, the command processor 2104, and the register setting bus 2109. In this embodiment, the external bus 2121 is connected to the printer image processing block 2115 and the scanner image processing block 2114.

A memory controller 2122 is connected to the memory bus 2108, reads and writes image data from and to first and second image memories 2123 in accordance with requests from the printer image processing block 2115 and the scanner image processing block 2114, and makes refresh operation as needed with respect to the image memories 2123.

The scanner image processing block 2114 subjects image data read by the scanner 2070 to image processing such as a gamma correction. The printer image processing block 2115 subjects image data to be printed by the printer 2095 to image processing, thereby obtaining print data.

It should be noted that the system control block 2150, the image processing block 2149, the printer image processing block 2115, the scanner image processing block 2112 and the like in the controller unit 2000 may be integrated into a one-chip ASIC. Alternatively, these blocks may be integrated into independent ASICs.

The system control block 2150, the image processing block 2149, the printer image processing block 2115, the scanner image processing block 2112 and the like are supplied with electric power from a common supply source and driven with clock signals supplied by means of a gated clock system, as mentioned above.

Next, an explanation will be given of control of supply of gated clock system-based clock signals.

Figure 2:
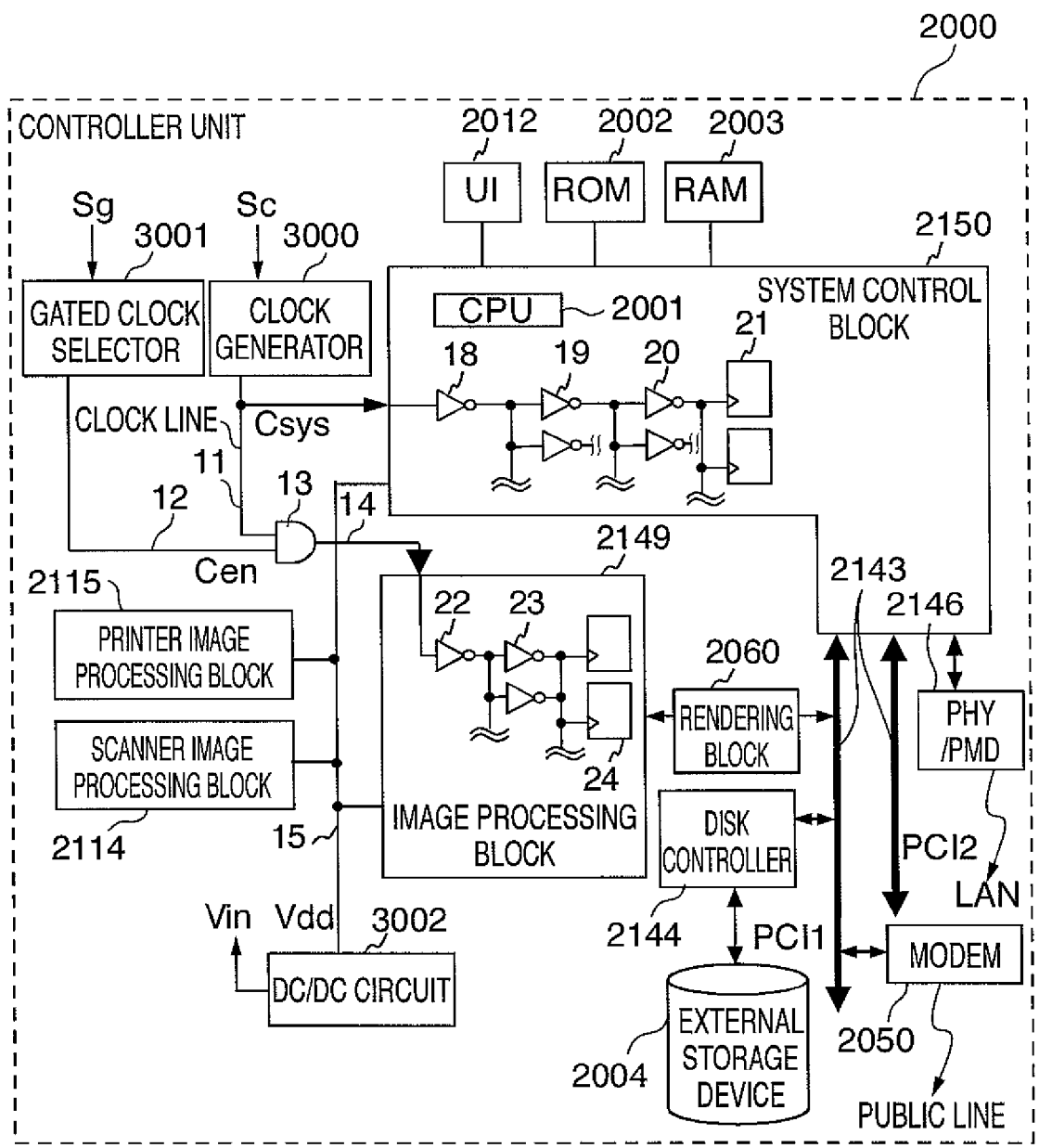
FIG. 2 is a block diagram showing a gated clock system-based clock signal supply control system according to a first embodiment of this invention.

As shown in FIG. 2, the controller unit 2000 includes a clock generator 3000, a gated clock selector 3001, a DC/DC circuit 3002, etc., in addition to the devices shown in FIG. 1. The clock generator 3000, which is constructed as a variable frequency oscillator, generates a system clock Csys having a frequency designated by a frequency control signal Sc, and supplies the system clock to the system control block 2150 and the image processing block 2149 through a clock line 11.

It should be noted that the system clock Csys is supplied through an AND gate 13 to the image processing block 2149. When the main power is ON, the system clock Csys is always supplied to the system control block 2150. On the other hand, the image processing block 2149 is supplied with the system clock Csys only during the time when a clock enable signal Cen is output from the gated clock selector 3001 to the AND gate 13 through a signal line 12. In this case, the AND gate 13 is in a gate ON state due to the supply of the clock enable signal Cen, so that the system clock Csys as one input signal to the AND gate 13 is supplied to the image processing block 2149 through a clock line 14.

The system control block 2150 includes buffers 18, 19 and 20 for amplifying the clock signal (the system clock Csys), flip-flops (mentioned later), and the like. These devices are tree-connected. As in the system control block 2150, the image processing block 2149 includes buffers 22 and 23, flip-flops 24 (mentioned later), and the like that are tree-connected.

Based on the supplied system clock Csys, the flip-flops 21, 24 control individual input/output timings of data and commands supplied from and to devices (circuits) such as the aforesaid first DMA 2130 and the bitmap trace circuit 2136.

The DC/DC circuit 3002 converts the supplied voltage Vin into various voltages which are different in voltage level from one another. Although only one power line 15 is shown in FIG. 2, there are a number of power lines in the controller unit 2000. The DC/DC circuit 3002 supplies the power lines with various powers that are different in voltage levels. As shown in FIG. 2, the DC/DC circuit 3002 supplies power Vdd having a predetermined voltage level from the power line 15 to the system control block 2150, the image processing block 2149, the printer image processing block 2115, the scanner image processing block 2114, and the like.

It should be noted that a capacitor, not shown, is inserted in place between the power line 15 and the ground line (not shown), in order to suppress an abrupt change or fluctuation in voltage of the power lines 15 which would be caused by an abrupt change in consumption current in the circuit blocks supplied with power from the DC/DC circuit 3002.

Figure 3:
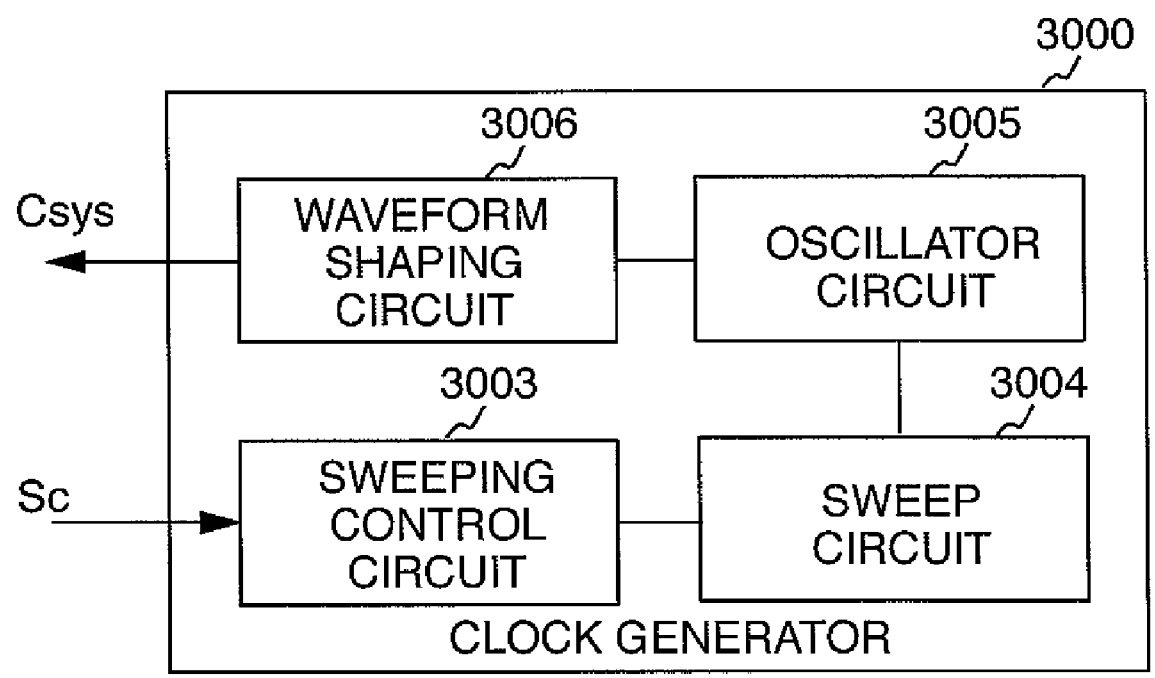
FIG. 3 is a block diagram showing the construction of a clock generator according to the first embodiment.

Next, an explanation is given of the construction of the clock generator 3000 according to the first embodiment with reference to FIG. 3. The clock generator 3000 includes an oscillator circuit 3005, a sweep circuit 3004, a waveform shaping circuit 3006, and a sweeping control circuit 3003, and continuously generates the system clock Csys having a frequency specified by the CPU 2001.

The oscillator circuit 3005 is implemented by a bridge-type CR oscillator circuit, for instance. The sweep circuit 3004 causes the oscillating frequency of the oscillator circuit 3005 to vary (sweep). In this case, the sweep circuit 3004 causes the capacitance, which is one of circuit constants of the oscillator circuit 3005, to continuously vary at a predetermined speed, thereby continuously changing the oscillating frequency.

The sweep operation of the sweep circuit 3004 is regulated by the sweeping control circuit 3003. Specifically, the sweeping control circuit 3003 determines the sweeping direction and sweeping speed of the oscillating frequency in the oscillation circuit 3005, and gives instructions on the sweeping direction and speed to the sweep circuit 3004. The sweep circuit 3004 sweeps the oscillation frequency of the oscillation circuit 3005 in the specified sweeping direction (in the low-frequency or high-frequency direction) at the specified sweeping speed.

The waveform shaping circuit 3006 shapes the oscillating signal generated from the oscillation circuit 3005 into a pulse shape suitable for the system clock Csys, and can be implemented by flip-flops or Schmitt trigger circuits, etc. The waveform shaping circuit 3006 outputs the waveform-shaped pulse signal as the system clock Csys.

As explained above, the system control block 2150 is always supplied with the system clock Csys. Thus, even when the controller unit 2000 enters or is in a waiting mode for energy saving, the system control block 2150 is kept operable. In the waiting mode, the system control block 2150 detects whether or not a print job has been transmitted through the LAN or the public line, and detects whether or not an operation to release the waiting mode has been made by the user through the console (UI) 2012, and so on.

On the other hand, the image processing block 2149, which is not supplied with the system clock Csys during the waiting mode, is kept in a sleep state. Specifically, in the waiting mode, the gated clock selector 3001 causes the clock enable signal Cen to be disabled, thereby stopping the supply of the system clock Csys to the image processing block 2149. In response to a waiting mode releasing signal Sg being input from the CPU 2001, the gated clock selector 3001 causes the clock enable signal Cen to be enabled, thereby starting the supply of the system clock Csys to the image processing block 2149 again.

Next, an explanation will be given of frequency control for the system clock Csys, which is proper to the first embodiment. The frequency control for a case where the waiting mode is released will be first explained with reference to FIG. 4.

The CPU 2001 of the system control block 2150 monitors, in the waiting mode, whether there is generated a job for which the image processing block 2149 is to be caused to wake up, i.e., whether there is generated a condition in which the system clock Csys is to be supplied to the image processing block 2149 (step S1). When the condition in which the system clock Csys is to be supplied to the image processing block 2149 is generated, the CPU 2001 outputs a frequency control signal Sc that instructs the clock generator 3000 to cause the system clock Csys to have a low-frequency fl that is lower than the standard frequency fstd (step S2).

The low frequency fl lower than the standard frequency fstd is determined in advance such that, when the supply of the system clock Csys to the image processing block 2149 is started or stopped, the output voltage level Vdd of the DC/DC circuit 3002 varies within a range of rated voltage level in which the system control block 2150 and the image processing block 2149 are kept operable (ditto in a second embodiment).

That is, when the supply of the system clock Csys to the image processing block 2149 is started or stopped, the frequency of the system clock Csys is temporarily made lower to thereby suppress the flip-flops 21, 24 and the like, which are operated with the system clock Csys, from abruptly starting or stopping their toggle operations. This prevents consumption currents in the system control block 2150 and the image processing block 2149 from abruptly increasing or decreasing, thus suppressing the decrease or increase in the output voltage level Vdd of the DC/DC circuit 3002 as much as possible.

An appropriate value of the low frequency fl must be determined based on the circuit scale of the system control block 2150 and the image processing block 2149, i.e., the rated consumption current therein. Upon such determination, it is preferable that the effect of suppressing the decrease or increase in the output voltage level Vdd of the DC/DC circuit 3002 attained by the temporal reduction in the frequency of the system clock Csys should be balanced with the decrease in the operation speed.

Next, the CPU 2001 determines whether or not the frequency of the system clock Csys output from the clock generator 3000 has reached the instructed low frequency fl (step S3). When the frequency of the system clock Csys has reached the instructed low frequency fl, the CPU 2001 outputs a waiting mode releasing signal Sg to the gated clock selector 3001 (step S4). In this case, the gate clock selector 3001 causes the clock enable signal Cen to be enabled (refer to FIG. 6) to thereby cause the AND gate 13 to open, so that the system clock Csys is input to the image processing block 2149 (step S4).

Next, the CPU 2001 outputs a frequency control signal Sc that instructs the clock generator 3000 to return the frequency of the system clock Csys from the low-frequency fl to the standard frequency fstd (step S5). When confirming that the frequency of the system clock Csys output from the clock generator 3000 has returned to the standard frequency fstd (step S6) (refer to FIG. 6), the CPU 2001 finishes the system clock Csys frequency control for the case where the waiting mode is released.

Upon start of the supply of the system clock Csys to the image processing block 2149, the frequency of the system clock Csys is temporarily made to the low frequency fl and immediately thereafter returned to the ordinary standard frequency fstd, as mentioned above. This makes it possible to suppress the decrease in operation speeds of the system control block 2150 and the image processing block 2149 as small as possible as well as to suppress the variation in current as small as possible when the clock signal supply to the circuit blocks is started.

Next, with reference to the flowchart shown in FIG. 5, an explanation will be given of control of the frequency of the system clock Csys for a case where the supply of the system clock Csys to the image processing block 2149 is stopped (disconnected).

The CPU 2001 detects whether the image processing block 2149 is in an operating state or a nonoperating state using a predetermined timer and the like. When the image processing block 2149 has been kept in the nonoperating state for a period of time equal to or longer than a waiting-mode sustainable period of time determined in advance by the user, the CPU 2001 determines that the supply of the system clock Csys to the image processing block 2149 has been disconnected for any reasons (step S21), and then carries out processing of steps S22 to S26.

It should be noted that the processing of the steps S22 to S26 other than S24 is the same as the processing of the steps S2 to S6 in FIG. 4, and therefore only the step S24 will be explained hereinbelow. In the step S24, the CPU 2001 outputs a waiting mode setting signal to the gated clock selector 3001 when it is determined at the step S23 that the frequency of the system clock Csys has reached the instructed low frequency fl. In this case, the gated clock selector 3001 causes the clock enable signal Cen to be disabled (refer to FIG. 6) to close the AND gate 13, thereby performing control to stop (disconnect) the supply of the system clock Csys to the image processing block 2149.

Figure 4:
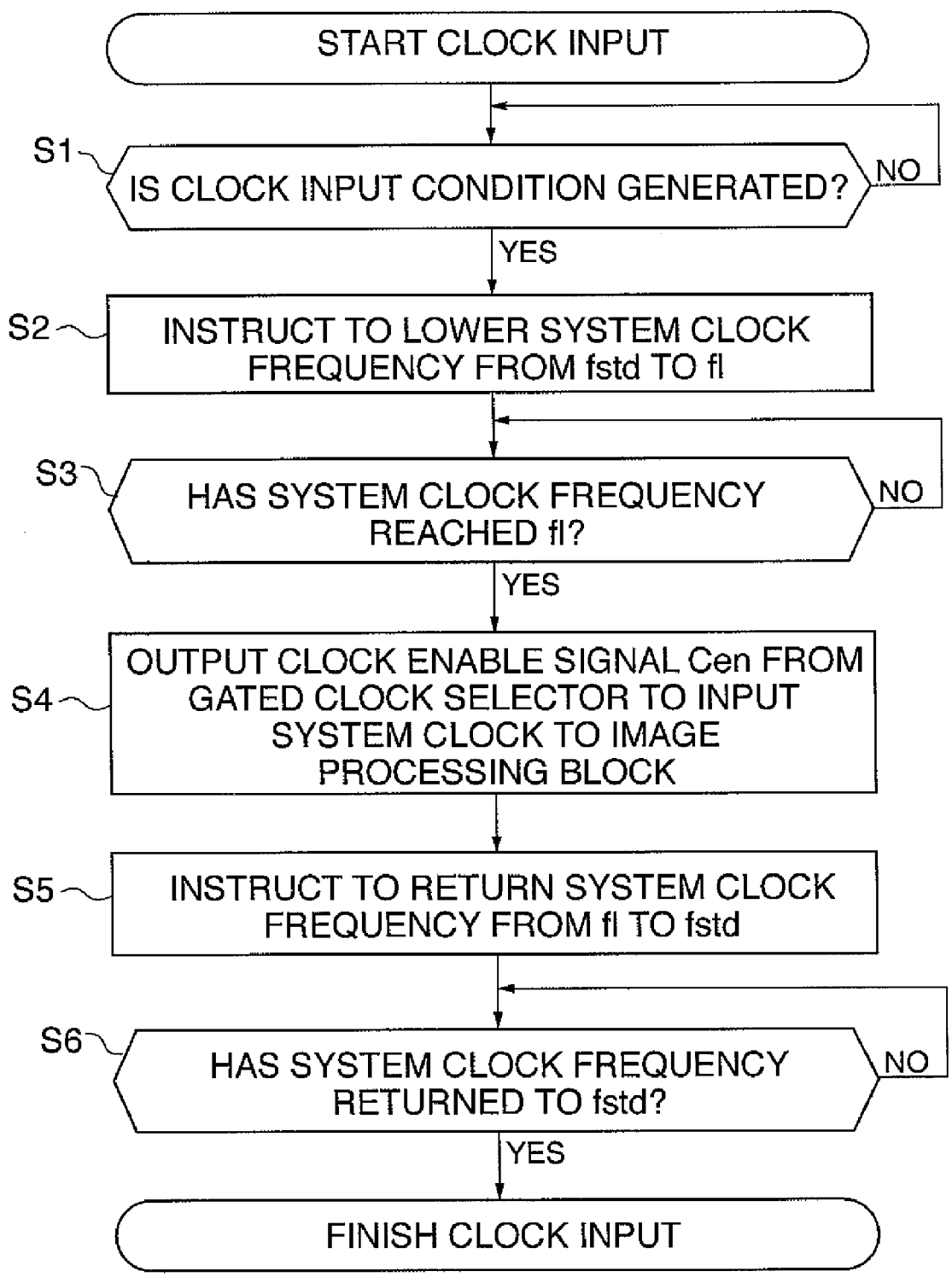
FIG. 4 is a flowchart of clock signal frequency control according to the first embodiment implemented at start of clock signal supply.
Figure 5:
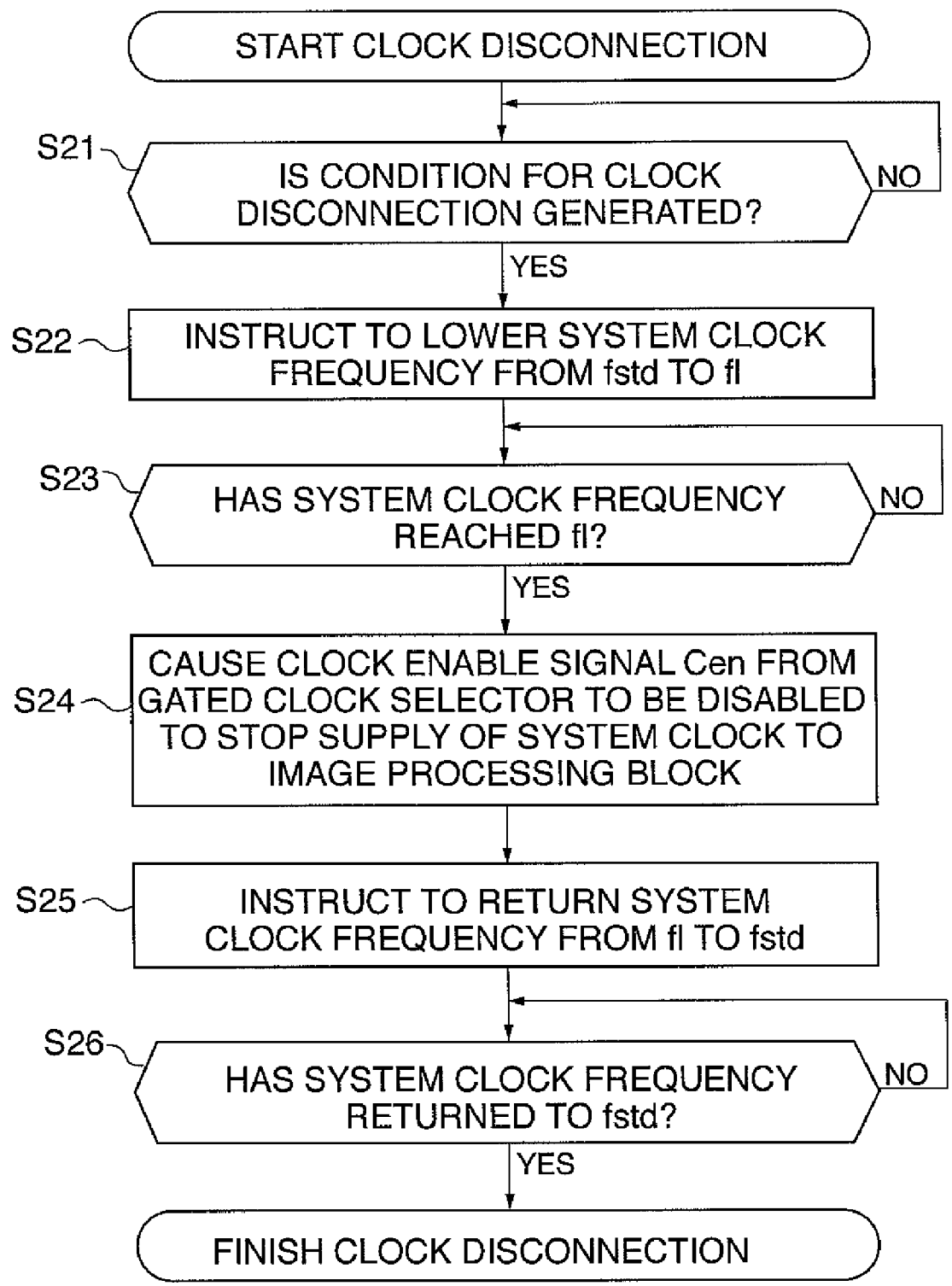
FIG. 5 is a flowchart of clock signal frequency control according to the first embodiment implemented upon termination of clock signal supply.
Figure 6:
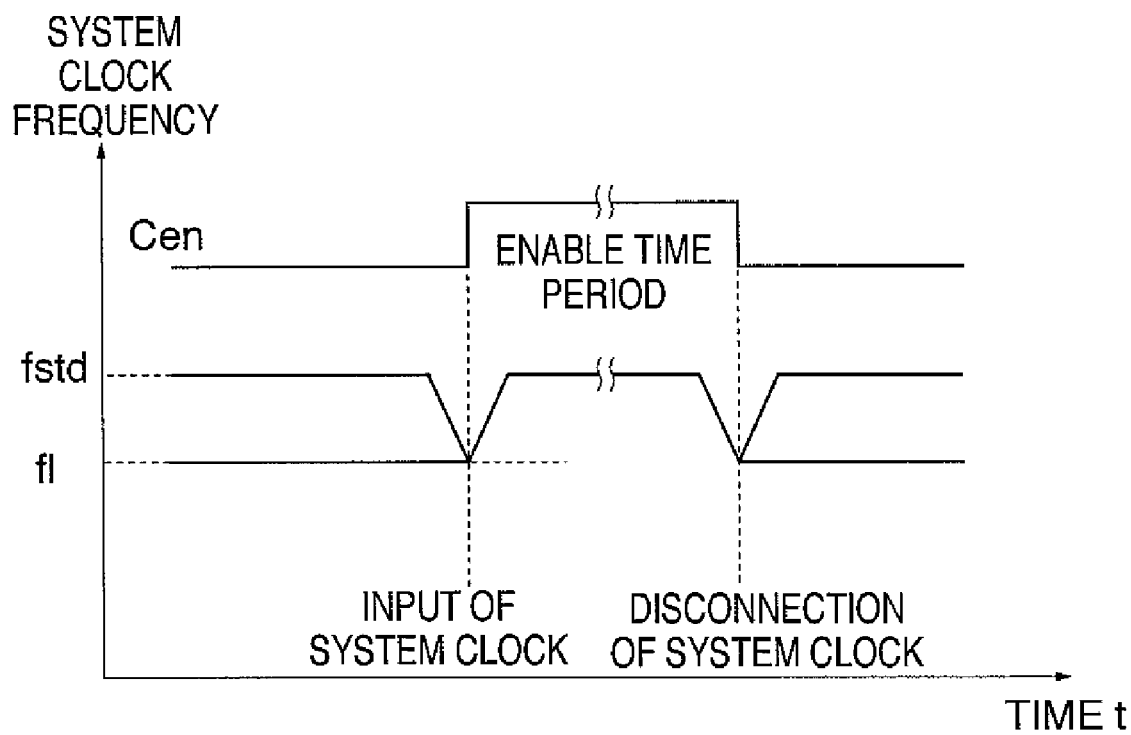
FIG. 6 is a timing chart of the frequency control shown in FIGS. 4 and 5.

FIG. 6 is a timing chart showing the processing content in FIGS. 4 and 5. In sweeping the frequency of the system clock Csys, the system clock frequency is gradually continuously changed in the first embodiment, as shown in FIG. 6. Also in this point, it is possible to suppress as small as possible a variation in the output voltage Vdd of the DC/DC circuit 3002 caused by variations in consumption currents in the system control block 2150 and the image processing block 2149 which are caused by a variation in the system clock frequency.

Second Embodiment

Figure 7:
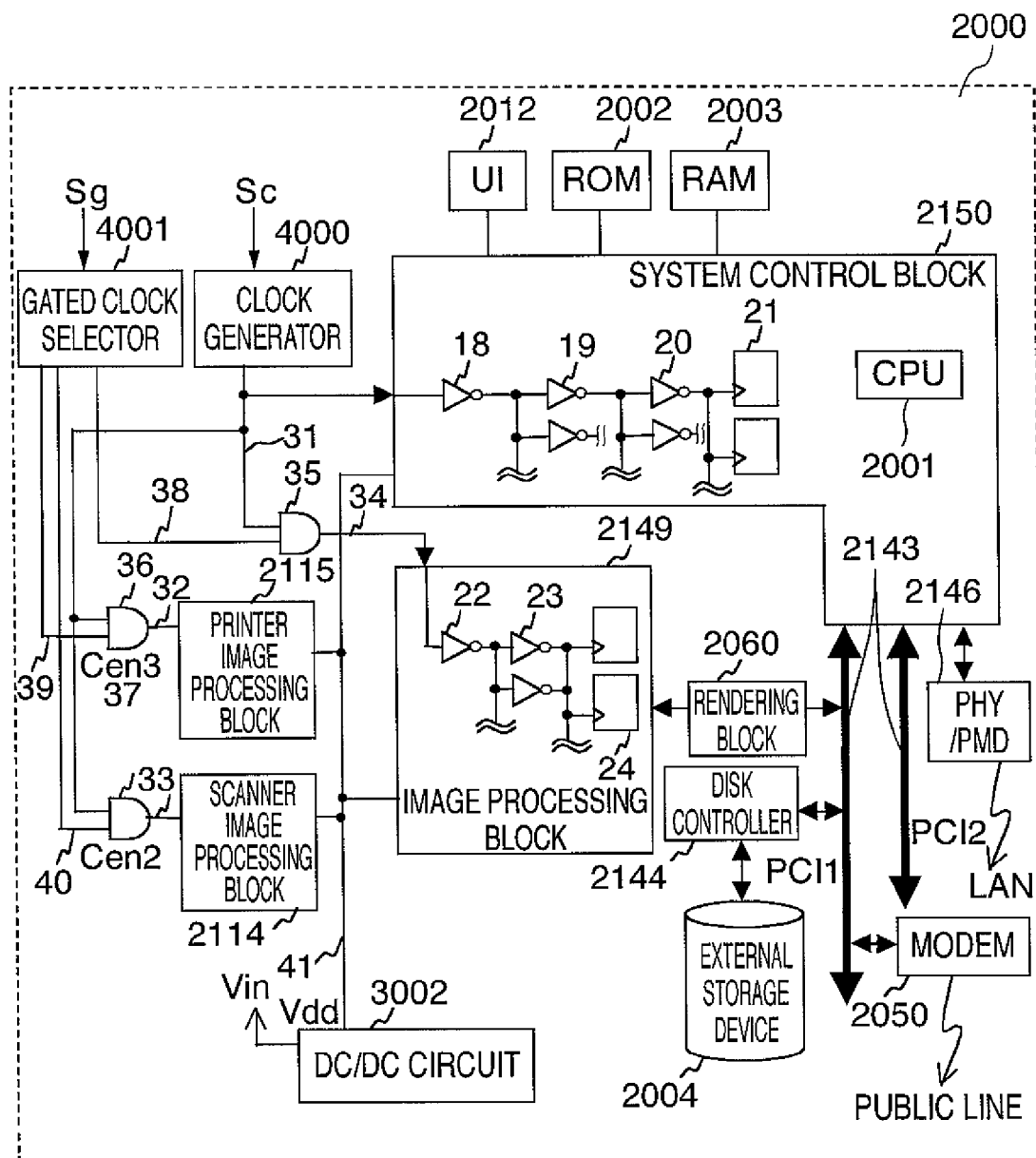
FIG. 7 is a block diagram showing a gated clock system-based clock signal supply control system according to a second embodiment of this invention.

Next, a second embodiment of the present invention will be explained with reference to FIGS. 7 to 12. FIG. 17 shows the construction of the system controller 2000 according to the second embodiment in respect of frequency control for the system clock Csys. This embodiment largely differs from the first embodiment in that AND gates 36 and 37 are provided as shown in FIG. 7, thereby making it possible to supply the system clock Csys also to the printer image processing block 2115 and the scanner image processing block 2114.

Specifically, as in the first embodiment, the system clock Csys from the clock generator 4000 is always supplied to the system control block 2150 through a clock line 31 in this embodiment when the main power is ON. As in the first embodiment, it is possible to supply the system clock Csys also to the image processing block 2149 through the clock line 31, an AND gate 35, and a clock line 34. It should be noted that an enable signal Cen1 from the gated clock selector 4001 is supplied to one input terminal of the AND gate 35 through a signal line 38.

As with the AND gate 35, enable signals Cen3 and Cen4 from the gated clock selector 4001 are supplied through signal lines 39, 40 also to input terminals of the AND gates 36, 37 which are added in this second embodiment. It should be noted that the clock line 31 is connected to the other input terminals of the AND gates 36, 37.

The system clock Csys, which is the output signal from each of the AND gates 36 and 37, is supplied through clock lines 32, 33 to the printer image processing block 2115 and the scanner image processing block 2114. Although illustrations are omitted, the printer image processing block 2115 and the scanner image processing block 2114 each have, of course, buffers, flip-flops, etc., which are in a tree structure, as in the system control block 2150 and the image processing block 2149 (ditto in the first embodiment). The other elements in the second embodiment are the same as those in the first embodiment shown in FIG. 2 and explanations thereof will be omitted here.

Next, the construction of the clock generator 4000 according to the second embodiment will be explained with reference to FIG. 8.

Figure 8:
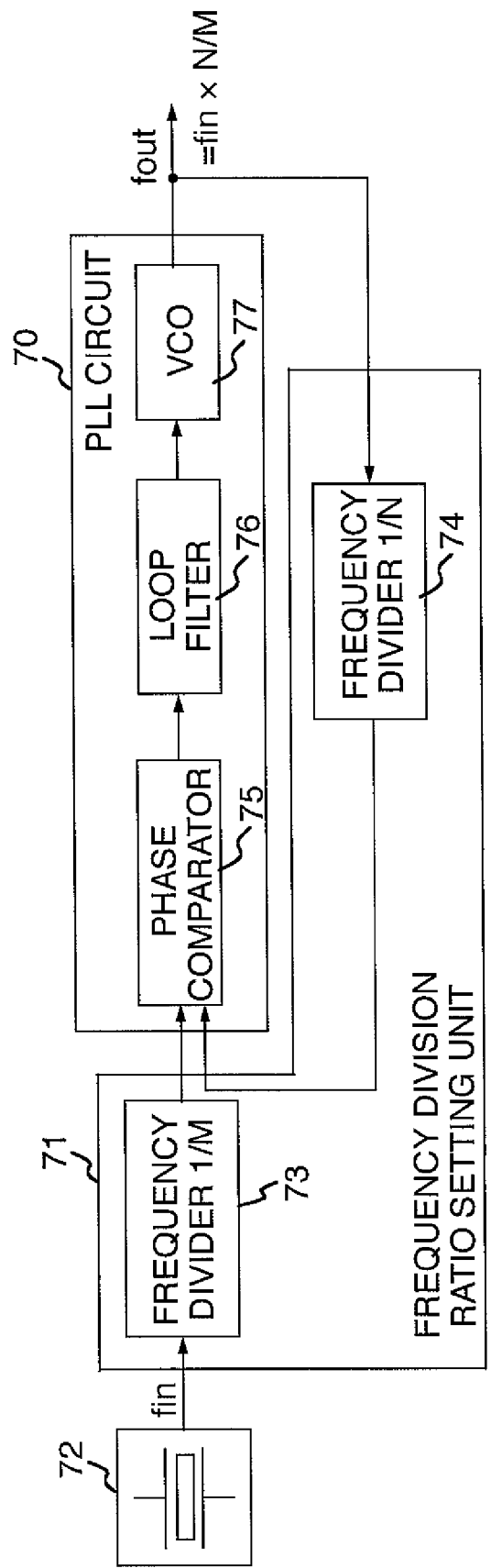
FIG. 8 is a block diagram showing the construction of a clock generator according to the second embodiment.

Referring to FIG. 8, an oscillation circuit 72 is for generating a clock signal having a predetermined frequency, and a quartz crystal oscillator is generally used therefor. A frequency division ratio setting unit 71 sets a frequency division ratio in a frequency divider 73 for dividing the frequency of the clock signal from the oscillator circuit 72 and a frequency division ratio in a frequency divider 74 for dividing the frequency of the output signal from a PLL (Phase Locked Loop) circuit 70, mentioned later. The PLL circuit 70 includes a phase comparator 75, a loop filter 76, and a VCO (Voltage Controlled Oscillator) 77.

The phase comparator 75 detects a phase difference (error) between the output signals from the frequency dividers 73 and 74, and outputs an error voltage signal varying in proportion to the detected error. The loop filter 76 is comprised of a low pass filter, and smoothens a DC error voltage signal output from the phase comparator 75 and including AC components. The VCO 77 is a variable frequency oscillator, and oscillates while controlling the oscillating frequency to the direction of reducing the error (phase difference) in accordance with the error voltage signal output from the loop filter 76.

To arbitrarily change the oscillating frequency of the PLL circuit 70, the frequency division ratio setting unit 71 is provided. In the frequency division ratio setting unit 71, the frequency division ratios in the frequency dividers 73, 74 are set in accordance with instructions from the CPU 2001, whereby the frequency fin of the clock signal output from the oscillator circuit 72 can be divided with an arbitrary frequency division ratio and the resultant signal can be output from the PLL circuit 70. For example, the frequency division ratio of "1/N" is set in the frequency divider 74, whereas the frequency division ratio of "1/M" is set in the frequency divider 73. In this case, the frequency fout of the clock signal output from the PLL circuit 70 is "N/M" times as large as the input frequency fin. The output frequency fout corresponds, of course, to the frequency of the system clock Csys.

Next, control of the frequency of the system clock Csys will be explained, which is proper to the second embodiment. First, an explanation will be given of control of the frequency of the system clock Csys in a case where the waiting mode is released to cause two circuit blocks to simultaneously wake up, out of a plurality of circuit blocks which are in a sleep state. In the following example, it is assumed that the image processing block 2149, the printer image processing block 2115, and the scanner image processing block 2114 are each in a sleep state.

Figure 9:
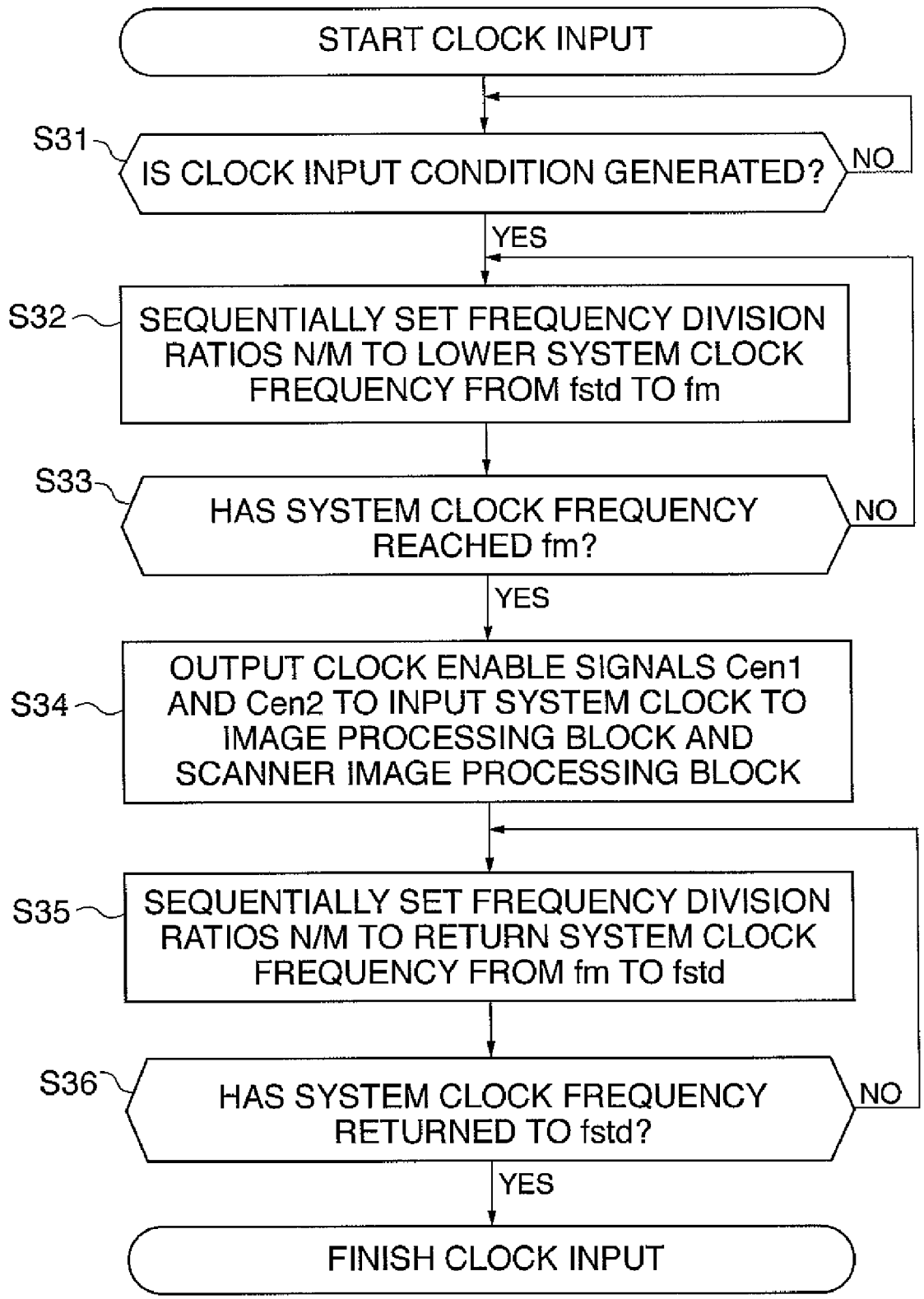
FIG. 9 is a flowchart of clock signal frequency control according to the second embodiment, which is carried out when the clock signal supply to two circuit blocks is simultaneously started.

Referring to a flowchart of FIG. 9, in the waiting mode, the CPU 2001 of the system control block 2150 monitors whether there is generated a job for which the circuit blocks in a sleep state is to be caused to wake up, i.e., whether there is generated a condition in which the system clock Csys must be supplied to the circuit blocks in a sleep state (step S31).

For example, it is assumed here that there is generated a send job that processes information of an original read by the scanner 2070 into electronic data and transmits the electronic data. In order to carry out the send job, the image processing block 2149 and the scanner image processing block 2114 which are currently in a sleep state must be used. When detecting at the step S31 that a send job is generated, the CPU 2001 sequentially outputs frequency control signals Sc to the clock generator 4000 to instruct it to change the frequency of the system clock Csys to a low frequency fm that is lower than a standard frequency fstd (step S32).

Each of the frequency control signals Sc in this embodiment includes information on a frequency division ratio "N/M" to realize the target low frequency fm to be set in the frequency division ratio setting unit 71. To attain the frequency division ratio "N/M" corresponding to the target low frequency fm, frequency control signals Sc including information on frequency division ratios gradually changing stepwise toward the frequency division ratio "N/M" are sequentially output from the CPU 2001 to the clock generator 4000.

Figure 12:
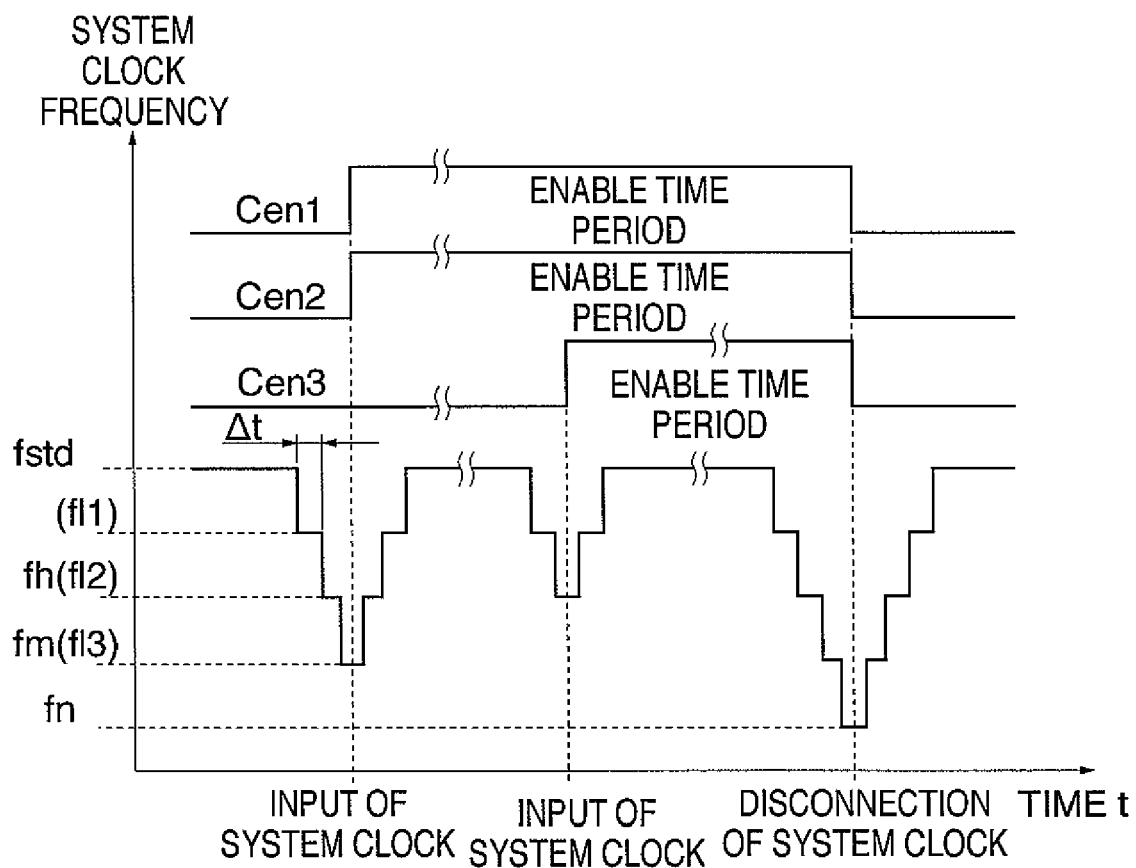
FIG. 12 is a timing chart of the frequency control shown in FIGS. 9-11.

More specifically, as shown in FIG. 12, the CPU 2001 sets the frequency division ratios N/M one by one in the frequency division ratio setting unit 71 at intervals of a predetermined time period Δt, wherein the frequency division ratios N/M respectively correspond to frequencies fl1, fl2 and fl3(=fm) gradually decreasing in this order (step S32). For example, in a case where the standard frequency fstd equals to 1.5 GHz and the frequency is to be decreased to the target low frequency fm of 600 MHz, the CPU 2001 sets the frequency division ratios N/M respectively equal to "4/5", "3/5", and "2/5", one by one in the frequency division ratio setting unit 71 at intervals of the time period of Δt. As a result, the frequency of the system clock Csys decreases stepwise from fstd (=1.5 GHz) to fl1 (=1.2 GHz) to fl2 (=fh=900 MHz) and to fl3 (=fm=600 MHz).

The role of the target low frequency fm is basically the same as that in the first embodiment. Nevertheless, the target low frequency fm in the second embodiment is different from the low frequency fl in the first embodiment in that it is determined based on the circuit scale of the circuit blocks that are caused to simultaneously wake up, i.e., the total rated power consumption in these circuit blocks.

The total rated power consumption of the image processing block 2149 and the scanner image processing block 2114 caused to simultaneously wake up in the second embodiment is of course larger than the rated power consumption of the image processing block 2149 caused to wake up in the first embodiment. Accordingly, the target low frequency fm in the second embodiment is made lower than the low frequency fl in the first embodiment.

Next, the CPU 2001 determines whether or not the frequency of the system clock Csys output from the clock generator 4000 has reached the instructed low frequency fm (step S33). If it is determined that the low frequency fm has not been reached, the CPU 2001 returns to the step S32 in which the frequency control signal Sc that includes the frequency division ratio "N/M" corresponding to the next lower frequency is output to the clock generator 4000.

On the other hand, if it is determined that the frequency of the system clock Csys has reached the instructed low frequency fm (refer to FIG. 12), the CPU 2001 outputs a waiting mode releasing signal Sg to the gated clock selector 4001 (step S34).

The waiting mode releasing signal Sg includes information on the circuit blocks to be caused to wake up (here, pieces of identification information on the image processing block 2149 and the scanner image processing block 2114).

The gated clock selector 4001 causes the clock enable signals Cen1 and Cen2 to be in an enabled state (refer to FIG. 12), to thereby cause the AND gates 35 and 37 to open, so that the system clock Csys is supplied to the image processing block 2149 and the scanner image processing block 2114 (step S34).

Next, the CPU 2001 sequentially outputs frequency control signals Sc to the clock generator 4000 to instruct the same to gradually return the frequency of the system clock Csys from the low frequency fm to the standard frequency fstd (step S35).

As with the case of the step S32, these frequency control signals Sc each include information on the frequency division ratio "N/M" to be set in the frequency division ratio setting unit 71. As the frequency division ratios "N/M", frequency division ratios gradually increasing to realize the frequency division ratio "N/M" corresponding to the standard frequency fstd are output in sequence to the frequency division ratio setting unit 71 (refer to FIG. 12). The gradually increasing frequency division ratios are set in the reverse order to that in the step S32. For instance, in the above example, the CPU 2001 sequentially sets the frequency division ratios "N/M" of "3/5", "4/5", and "5/5" in the frequency division ratio setting unit 71 at intervals of the time period of Δt. As a result, the frequency of the system clock Csys increases stepwise from fl3 (=fm 600 MHz) to fl2 (=fh=900 MHz) to fl1 (=1.2 GHz) and to fstd (=1.5 GHz).

Then, the CPU 2001 determines whether or not the frequency of the system clock Csys output from the clock generator 4000 has returned to the instructed standard frequency fstd (step S36). If it is determined that the frequency has not returned to the standard frequency fstd, the CPU 2001 returns to the step S35 in which the frequency control signal Sc that includes the frequency division ratio "N/M" corresponding to the next higher frequency is output to the clock generator 4000.

On the other hand, if it is determined that the frequency of the system clock Csys has returned to the instructed standard frequency fstd (refer to FIG. 12), the CPU 2001 finishes the system clock Csys frequency control for the case where the two circuit blocks are caused to simultaneously wake up.

When the simultaneous supply of the system clock Csys to a plurality of circuit blocks is started, the frequency of the system clock Csys is temporarily swept to a lower frequency and immediately thereafter returned to the former standard frequency fstd, as in the first embodiment. As a result, current fluctuation in the plurality of circuit blocks, i.e., variation in the output voltage of the DC/DC circuit 3002, which is caused when the clock signal is simultaneously supplied to the circuit blocks, can be suppressed as small as possible. In addition, a reduction in operating speed of the system control block 2150 and the circuit blocks caused to wake up can be suppressed as small as possible (ditto in the case of FIGS. 10 and 11 mentioned later).

Figure 10:
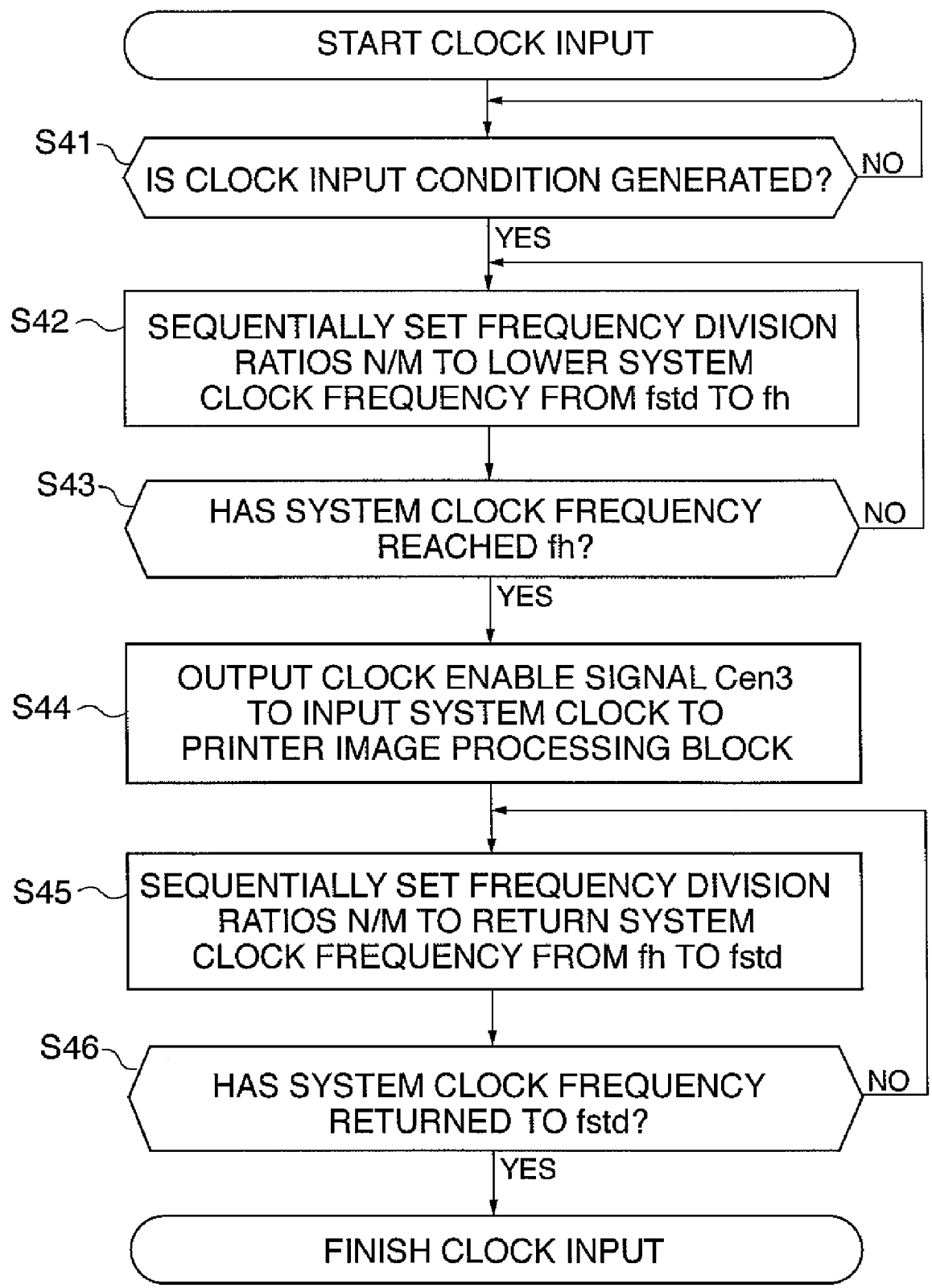
FIG. 10 is a flowchart showing clock signal frequency control according to the second embodiment, which is carried out when the clock signal supply to one circuit block is started.

Next, with reference to a flowchart of FIG. 10, an explanation will be given of control of the frequency of the system clock Csys for a case where the waiting mode is released to cause one of a plurality of circuit blocks which are in a sleep state to wake up.

In the waiting mode, the CPU 2001 of the system control block 2150 monitors whether there is generated a job for which one of circuit blocks in a sleep state is to be caused to wake up, i.e., whether there is generated a condition in which the system clock Csys must be supplied to the one circuit block in a sleep state (step S41).

For example, it is assumed here that a print job is generated after the processing for the send job in the first embodiment is completed and before the waiting mode is released. In order to carry out the print job, the printer image processing block 2115 which is currently in a sleep state must be used. When detecting at the step S41 that the print job is generated, the CPU 2001 outputs frequency control signals Sc to the clock generator 4000 in sequence to instruct the same to change the frequency of the system clock Csys to a low frequency fh that is lower than the standard frequency fstd (step S42).

Each of the frequency control signals Sc includes information on the frequency division ratio "N/M" to realize the target low frequency fh to be set in the frequency division ratio setting unit 71. To attain the frequency division ratio "N/M" corresponding to the target low frequency fh, the frequency control signals Sc including information on frequency division ratios gradually changing stepwise toward the frequency division ratio "N/M" are output in sequence from the CPU 2001 to the clock generator 4000.

More specifically, for example, in a case where the standard frequency fstd equals to 1.5 GHz and the frequency is to be decreased to the target low frequency fh of 900 MHz, the CPU 2001 sequentially sets the frequency division ratios N/M respectively equal to "4/5" and "3/5" in the frequency division ratio setting unit 71 at intervals of the time period of Δt. As a result, the frequency of the system clock Csys decreases stepwise from fstd (=1.5 GHz) to fl1 (=1.2 GHz) and to fl2 (=fh=900 MHz).

The role of the low frequency fh is basically the same as that in the first embodiment. Nevertheless, the low frequency fh in this case is determined based on the circuit scale of the circuit block to be caused to wake up, i.e., the rated power consumption of this circuit block.

Specifically, it is enough to cause the printer image processing block 2115 alone to wake up to perform the print job, unlike the case where the send job is performed in which the image processing block 2149 and the scanner image processing block 2114 must be caused to simultaneously wake up.

It is assumed here that the rated power consumption of the printer image processing block 2115 presently caused to wake up is less than the total rated power consumption of the image processing block 2149 and the scanner image processing block 2114 previously caused to simultaneously wake up. A variation in the output voltage of the DC/DC circuit 3002 is smaller when only the printer image processing block 2115 is caused to wake up than when the image processing block 2149 and the scanner image processing block 2114 are caused to simultaneously wake up.

The target low frequency fh for the case where only the printer image processing block 2115 is to be caused to wake up is higher than the target low frequency fm for the case where the image processing block 2149 and the scanner image processing block 2114 are caused to simultaneously wake up (refer to FIG. 12).

By changing the target frequency, to which the frequency of the system clock Csys is temporarily decreased, in dependence on the magnitude of the power consumption of one or more circuit blocks that are to be caused to wake up, it is possible to suppress a variation in the output voltage of the DC/DC circuit 3002 caused at the time of wake up, without excessively lowering the processing speeds of the system control block 2150 and other blocks which are always operated with the system clock Csys.

Next, the CPU 2001 determines whether or not the frequency of the system clock Csys output from the clock generator 4000 has reached the instructed low frequency fh (step S43). If it is determined that the low frequency fh has not been reached, the CPU 2001 returns to the step S42 in which the frequency control signal Sc that includes the frequency division ratio "N/M" corresponding to the next lower frequency is output to the clock generator 4000.

On the other hand, if it is determined that the frequency of the system clock Csys has reached the instructed low frequency fh (refer to FIG. 12), the CPU 2001 outputs a waiting mode releasing signal Sg to the gated clock selector 4001 (step S44).

The waiting mode releasing signal Sg includes information on the circuit block to be caused to wake up (here, identification information on the printer image processing block 2115). The gated clock selector 4001 causes the clock enable signal Cen3 to be in an enabled state (step S44)(refer to FIG. 12), to thereby cause the AND gate 36 to open, so that the system clock Csys is supplied to the printer image processing block 2115.

Next, the CPU 2001 sequentially outputs frequency control signals Sc to the clock generator 4000 to instruct the same to gradually return the frequency of the system clock Csys from the low frequency fh to the standard frequency fstd (step S45).

As with the case of the step S42, these frequency control signals Sc each include information on the frequency division ratio "N/M" to be set in the frequency division ratio setting unit 71. As the frequency division ratios "N/M", frequency division ratios gradually increasing to realize the frequency division ratio "N/M" corresponding to the standard frequency fstd are output in sequence to the frequency division ratio setting unit 71 (refer to FIG. 12). The gradually increasing frequency division ratios are set in the reverse order to that in the step S42. For instance, in the above example, the CPU 2001 sequentially sets the frequency division ratios "N/M" of "4/5" and "5/5" in the frequency division ratio setting unit 71 at intervals of the time period of Δt. As a result, the frequency of the system clock Csys increases stepwise from fl2 (=fh=900 MHz) to fl1 (=1.2 GHz) and to fstd (=1.5 GHz).

Then, the CPU 2001 determines whether or not the frequency of the system clock Csys output from the clock generator 4000 has returned to the instructed standard frequency fstd (step S46). If it is determined that the frequency has not returned to the standard frequency fstd, the CPU 2001 returns to the step S45 in which the frequency control signal Sc that includes the frequency division ratio "N/M" corresponding to the next higher frequency is output to the clock generator 4000.

On the other hand, if it is determined that the frequency of the system clock Csys has returned to the instructed standard frequency fstd (refer to FIG. 12), the CPU 2001 finishes the system clock Csys frequency control for the case where one circuit block is caused to wake up.

Figure 11:
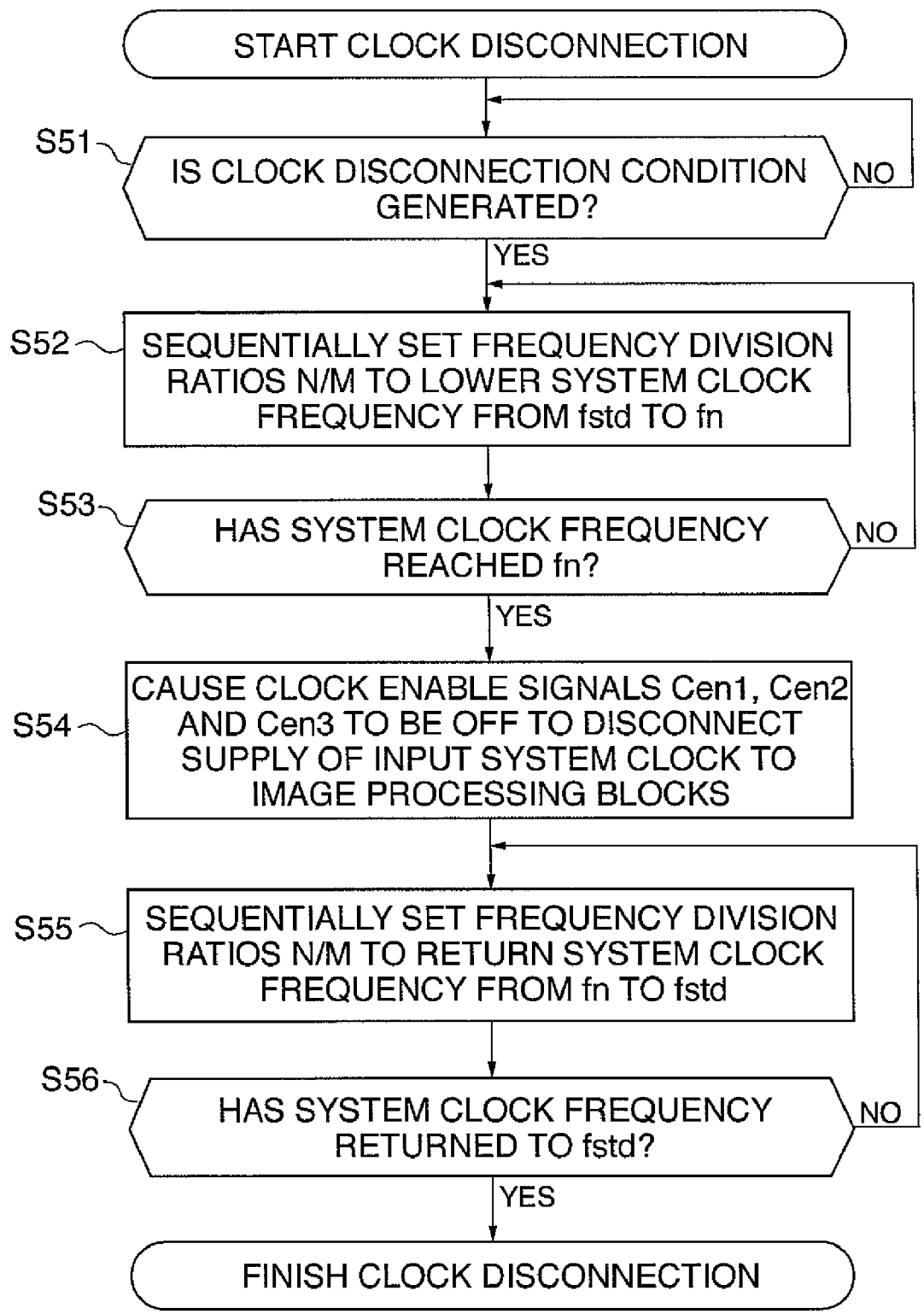
FIG. 11 is a flowchart showing clock signal frequency control according to the second embodiment, which is carried out when the clock signal supply to three circuit blocks is simultaneously stopped.

Next, with reference to a flowchart of FIG. 11, an explanation will be given of control of frequency of the system clock Csys for a case where the waiting mode is set to cause all the three circuit blocks which are in a wake-up state to sleep.

In a state where the waiting mode is released, the CPU 2001 of the system control block 2150 monitors job status and determines based on a predetermined timer and the like whether there is a wake-up circuit block that is to be caused to enter a sleep state (step S51).

For example, it is assumed here that there are circuit blocks that have been in a nonoperating state for a time period longer than a predetermined time period after completion of the aforesaid print job. The processing for determining circuit blocks that are in a nonoperating state and are to be caused to enter a sleep state may be executed individually circuit block by circuit block, or may be executed collectively for the entire circuit blocks regarding them as one circuit block.

Assuming here that it is determined at the step S51 that three circuit blocks, i.e., the image processing block 2149, the scanner image processing block 2114, and the printer image processing block 2115, are needed to be caused to enter a sleep state. In this case, the CPU 2001 sequentially outputs frequency control signals Sc to the clock generator 4000 to instruct the same to change the frequency of the system clock Csys to a low frequency fn that is lower than the standard frequency fstd (step S52).

Each of the frequency control signals Sc includes information on the frequency division ratio "N/M" to realize the target low frequency fn to be set in the frequency division ratio setting unit 71. To attain the frequency division ratio "N/M" corresponding to the target low frequency fn, frequency control signals Sc including information on frequency division ratios gradually changing stepwise toward the frequency division ratio "N/M" are output in sequence from the CPU 2001 to the clock generator 4000.

More specifically, for example, in a case where the standard frequency fstd equals to 1.5 GHz and the frequency is to be decreased to the target low frequency fn of 300 MHz, the CPU 2001 sequentially sets the frequency division ratios N/M respectively equal to "4/5", "3/5", "2/5" and "1/5" in the frequency division ratio setting unit 71 at intervals of the time period of Δt. As a result, the frequency of the system clock Csys decreases stepwise from fstd (=1.5 GHz) to fl1 (=1.2 GHz) to fl2 (=fh=900 MHz) to fl3 (=fm=600 MHz) and to fn (=300 MHz).

The role of the low frequency fn is basically the same as that in the first embodiment. Nevertheless, the low frequency fn in this case is determined based on the circuit scale of the circuit blocks to be caused to simultaneously enter a sleep state, i.e., the total rated power consumption of these circuit blocks.

Specifically, in the present sleep process, three circuit blocks, i.e., the image processing block 2149, the scanner image processing block 2114 and the printer image processing block 2115 are needed to be caused to simultaneously enter a sleep state, unlike the case where the send job is performed in which the image processing block 2149 and the scanner image processing block 2114 are needed to be caused to simultaneously wake up.

As understood from the foregoing explanations, the total rated power consumption of the image processing block 2149, the scanner image processing block 2114, and the printer image processing block 2115 that are caused to enter a sleep state is greater than the total rated power consumption of the image processing block 2149 and the scanner image processing block 2114 that are caused to simultaneously wake up.

The target low frequency fn for the case where the three circuit blocks are caused to enter a sleep state is made lower than the target low frequency fm for the case where two circuit blocks are caused to simultaneously wake up (refer to FIG. 12).

Next, the CPU 2001 determines whether or not the frequency of the system clock Csys output from the clock generator 4000 has reached the instructed low frequency fn (step S53). If it is determined that the low frequency fn has not been reached, the CPU 2001 returns to the step S52 in which the frequency control signal Sc that includes the frequency division ratio "N/M" corresponding to the next lower frequency is output to the clock generator 4000.

On the other hand, if it is determined that the frequency of the system clock Csys has reached the instructed low frequency fn (refer to FIG. 12), the CPU 2001 outputs a waiting mode releasing signal Sg to the gated clock selector 4001 (step S54).

The waiting mode releasing signal Sg includes information on the circuit blocks caused to enter a sleep state (here, pieces of identification information on the image processing block 2149, the scanner image processing block 2114, and the printer image processing block 2115). The gated clock selector 4001 causes the clock enable signals Cen1, Cen2 and Cen3 to be in a disabled state (step S54) (refer to FIG. 12), to thereby cause the AND gates 35, 36 and 37 to close, so that the supply of the system clock Csys to the image processing block 2149, the scanner image processing block 2114, and the printer image processing block 2115 is stopped.

Next, the CPU 2001 sequentially outputs frequency control signals Sc to the clock generator 4000 to instruct the same to gradually return the frequency of the system clock Csys from the low frequency fn to the standard frequency fstd (step S55).

As with the case of the step S52, these frequency control signals Sc each include information on the frequency division ratio "N/M" to be set in the frequency division ratio setting unit 71. As the frequency division ratios "N/M", frequency division ratios gradually increasing to realize the frequency division ratio "N/M" corresponding to the standard frequency fstd are output in sequence to the frequency division ratio setting unit 71 (refer to FIG. 12). The gradually increasing frequency division ratios are set in the reverse order to that in the step S52. For instance, in the above example, the CPU 2001 sequentially sets the frequency division ratios "N/M" of "2/5", "3/5", "4/5" and "5/5" in the frequency division ratio setting unit 71 at intervals of the time period of Δt. As a result, the frequency of the system clock Csys increases stepwise from fn (=300 MHz) to fl3 (=fm=600 MHz) and to fl2 (=fh 900 MHz) and from fl2 to fl1(=1.2 GHz) and to fstd (=1.5 GHz).

Then, the CPU 2001 determines whether or not the frequency of the system clock Csys output from the clock generator 4000 has returned to the instructed standard frequency fstd (step S56). If it is determined that the frequency has not returned to the standard frequency fstd, the CPU 2001 returns to the step S55 in which the frequency control signal Sc that includes the frequency division ratio "N/M" corresponding to the next higher frequency is output to the clock generator 4000.

On the other hand, if it is determined that the frequency of the system clock Csys has returned to the instructed standard frequency fstd (refer to FIG. 12), the CPU 2001 finishes the system clock Csys frequency control for the case where three circuit blocks are caused to enter the sleep mode.

As shown in FIG. 12, in the second embodiment, the frequency of the system clock Csys is changed stepwise at intervals of a predetermined time period. Also in this point, it is possible to suppress as small as possible a variation in the output voltage Vdd of the DC/DC circuit 3002 caused by variations in consumption currents of circuit blocks, such as the system control block 2150 and the image processing block 2149, which are caused by a variation in the system clock frequency.

Unlike the clock generator of the first embodiment that changes the capacitance of the oscillation circuit to thereby change the oscillating frequency in an analogue fashion, the second embodiment uses a PLL circuit to change the oscillating frequency of the clock generator in a digital fashion. According to the second embodiment, therefore, it is possible to change the frequency of the system clock Csys with higher resolution in a wider range as compared to the first embodiment.

Other Embodiments

In the first and second embodiments, the reducing rate of the frequency of the system clock Csys is determined so as to suppress a variation in the output voltage of the DC/DC circuit 3002 caused when the supply of the system clock Csys is started or stopped, without excessively lowering the processing speeds of the system control block 2150 and other blocks which are always operated with the system clock Csys.

Even in such cases, when the frequency of the system clock Csys is lowered, the processing speeds of the system control block 2150 and other blocks can be lowered to some extent.

In returning the frequency of the system clock Csys from the lowered frequency to the standard frequency fstd, the system clock frequency may be increased to temporarily exceed the standard frequency fstd so as to compensate for the reduction in processing speed, whereupon the system clock frequency may be decreased to the standard frequency fstd.

The functions of the first and second embodiments can be applied to information processing apparatuses such as cellular phones other than image processing apparatuses, and can also be applied various control, other than the control of information processing apparatuses, such as robot control, control of engine, suspension, braking, air bag, etc. in automobiles, control of moving bodies such as aircrafts, trains, ships other than automobiles.

The present invention is not limited to the applications to the apparatuses shown in the embodiments, but may be applied to a system comprised of a plurality of apparatuses each including one or more circuit blocks and to a single apparatus including at least one circuit block.

Further, it is to be understood that the object of the present invention may also be accomplished by supplying a system or an apparatus with a storage medium in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and therefore the program code and the storage medium in which the program code is stored constitute the present invention.

Examples of the storage medium for supplying the program code include a Floppy® disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network from another computer, a database, or the like, not shown, connected to the Internet, a commercial network, a local area network, or the like.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-340952, filed Nov. 25, 2005 which is hereby incorporated by reference herein in its entirety.

What is claimed is:

1. A clock supplying apparatus for supplying a clock signal to at least one circuit block, comprising:
   a generation unit that generates the clock signal;
   a control unit that controls a frequency of the clock signal generated by said generation unit; and
   a switching unit that switches between a first supply state and a second supply state, the first supply state being a state in which the generated clock signal is supplied to the circuit block, the second supply state being a state in which the generated clock signal is not supplied to the circuit block;
   wherein, when said switching unit switches the supply state, said control unit controls the frequency of the clock signal so as to be temporarily lowered to a frequency corresponding to an amount of power consumption during the switching of the circuit block for which the supply state is to be switched.

2. A clock supplying apparatus according to claim 1, including a plurality of circuit blocks, wherein said control unit controls the frequency of the clock signal so as to be temporarily lowered to a frequency corresponding to an amount of power consumption of circuit blocks for which said switching unit simultaneously switches the supply state.

3. A clock supplying apparatus according to claim 1, including a plurality of circuit blocks, wherein said control unit controls the frequency of the clock signal so as to be temporarily lowered to a frequency corresponding to number of circuit blocks for which said switching unit simultaneously switches the supply state.

4. A clock supplying apparatus according to claim 1, wherein, when lowering the frequency of the clock signal, said control unit causes the frequency to gradually lower toward a target frequency.

5. A clock supplying apparatus according to claim 4, wherein said control unit sets a new target frequency at intervals of predetermined period of time to thereby gradually lower the frequency of the clock signal toward a final target frequency.

6. A clock supplying apparatus according to claim 1, wherein, when changing the frequency of the clock signal from a standard frequency before change and then returning the frequency to the standard frequency, said control unit returns the frequency while compensating for a difference between clock cycles at the frequency after change and clock cycles at the standard frequency.

7. A clock supplying apparatus according to claim 1 including a plurality of circuit blocks, further comprising:
   a power supply unit that supplies voltage to each of the plurality of circuit blocks,
   wherein said generation unit supplies the clock signal to a specific circuit block included in the plurality of circuit blocks,
   wherein the first supply state being a state in which the generated clock signal is supplied to the specific circuit block,
   wherein the second supply state being a state in which the generated clock signal is not supplied to the specific circuit block, and
   wherein, when said switching unit switches the supply state, said control unit controls the frequency of the clock signal so as to be temporarily lowered to a frequency corresponding to an amount of power consumption of the specific circuit block for which the supply state is to be switched.

8. A control method for a clock supplying apparatus that supplies a clock signal to at least one circuit block, comprising:
   a control step of controlling a frequency of a clock signal generated by a generation unit; and
   a switching step of switching between a first supply state and a second supply state, the first supply state being a state in which the generated clock signal is supplied to the circuit block, the second supply state being a state in which the generated clock signal is not supplied to the circuit block,
   wherein, when said switching step switches the supply state, said control step controls the frequency of the clock signal so as to be temporarily lowered to a frequency corresponding to an amount of power consumption during the switching of the circuit block for which the supply state is to be switched.

9. A control method according to claim 8 wherein the clock supplying apparatus includes a plurality of circuit blocks, and wherein said control step controls the frequency of the clock signal so as to be temporarily lowered to a frequency corresponding to an amount of power consumption of circuit blocks for which said switching step simultaneously switches the supply state.

10. A control method according to claim 8, wherein the clock supplying apparatus includes a plurality of circuit blocks, and wherein said control step controls the frequency of the clock signal so as to be temporarily lowered to a frequency corresponding to number of circuit blocks for which said switching step simultaneously switches the supply state.

11. A control method according to claim 8, wherein, when lowering the frequency of the clock signal, said control step causes the frequency to gradually lower toward a target frequency.

12. A control method according to claim 11, wherein said control step sets a new target frequency at intervals of predetermined period of time to thereby gradually lower the frequency of the clock signal toward a final target frequency.

13. A control method according to claim 8 wherein, when changing the frequency of the clock signal from a standard frequency before change and then returning the frequency to the standard frequency, said control step controls to return the frequency while compensating for a difference between clock cycles at the frequency after change and clock cycles at the standard frequency.

14. A control method according to claim 8 wherein the clock supplying apparatus includes a plurality of circuit blocks and a power supply unit that supplies voltage to each of the plurality of circuit blocks,
   wherein said generation unit supplies the clock signal to a specific circuit block included in the plurality of circuit blocks,
   wherein the first supply state being a state in which the generated clock signal is supplied to the specific circuit block,
   wherein the second supply state being a state in which the generated clock signal is not supplied to the specific circuit block, and
   wherein, when said switching step switches the supply state, said control step controls the frequency of the clock signal so as to be temporarily lowered to a frequency corresponding to an amount of power consumption of the specific circuit block for which the supply state is to be switched.

* * * * *